(12) United States Patent
Wu et al.

(10) Patent No.: US 12,348,466 B2
(45) Date of Patent: Jul. 1, 2025

(54) INFORMATION PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Yuanye Wu, Beijing (CN); Ningsha Huang, Beijing (CN); Yifei Xue, Beijing (CN); Jian Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/388,514

(22) Filed: Nov. 9, 2023

(65) Prior Publication Data
US 2024/0080285 A1 Mar. 7, 2024

Related U.S. Application Data

(63) Continuation of application No. PCT/CN2022/090462, filed on Apr. 29, 2022.

(30) Foreign Application Priority Data

May 12, 2021 (CN) .......................... 202110518504.2

(51) Int. Cl.
*H04L 51/046* (2022.01)
*H04L 51/10* (2022.01)

(52) U.S. Cl.
CPC ............ *H04L 51/046* (2013.01); *H04L 51/10* (2013.01)

(58) Field of Classification Search
None
See application file for complete search history.

(56) References Cited

U.S. PATENT DOCUMENTS

2007/0168447 A1 7/2007 Chen et al.
2015/0363092 A1* 12/2015 Morton ............... G06F 3/04817
715/752

(Continued)

FOREIGN PATENT DOCUMENTS

CN 106302134 A 1/2017
CN 108932159 A 12/2018

(Continued)

OTHER PUBLICATIONS

International Patent Application No. PCT/CN2022/090462; Int'l Search Report; dated Jul. 27, 2022; 2 pages.

(Continued)

*Primary Examiner* — Natisha D Cox
(74) *Attorney, Agent, or Firm* — BakerHostetler (57) ABSTRACT

The disclosure relates to the technical field of computers, in particular to an information processing method and apparatus, an electronic device, and a storage medium. The information processing method provided by the disclosure includes: displaying a messaging interface, the messaging interface being configured to display a chat message; determining at least one chat message in the messaging interface; and in response to a task creation instruction, generating task information based on the determined message. According to the information processing method provided by the disclosure, by determining the chat message in the messaging interface and generating the task information based on the determined chat message, it can be facilitated for a user to create a task based on the chat message in the messaging interface, thereby improving the creation efficiency of the task information.

23 Claims, 3 Drawing Sheets

(56) References Cited

U.S. PATENT DOCUMENTS

| | | | | |
|---|---|---|---|---|
| 2018/0376211 A1* | 12/2018 | Geller | ................ | H04N 21/4756 |
| 2020/0244611 A1* | 7/2020 | Rosenstein | ........... | G06F 40/289 |
| 2020/0396184 A1* | 12/2020 | Perazzo | ................. | H04L 67/34 |
| 2020/0403951 A1* | 12/2020 | Kapoor | ................ | H04L 51/216 |

FOREIGN PATENT DOCUMENTS

| | | | |
|---|---|---|---|
| CN | 109587037 | A | 4/2019 |
| CN | 110581794 | A | 12/2019 |
| CN | 111292049 | A | 6/2020 |
| CN | 111369209 | A | 7/2020 |
| CN | 111756615 | A | 10/2020 |
| CN | 112437004 | A | 3/2021 |
| CN | 112732386 | A | 4/2021 |
| JP | 2019164743 | A | 9/2019 |

OTHER PUBLICATIONS

Written Opinion for International Application No. PCT/CN2022/090462, mailed Jul. 27, 2022, 6 Pages.
China Patent Application No. 202110518504.2; Reexamination Decision; dated Sep. 26, 2024; 40 pages.
European Patent Application No. 22806563.7; Office Action; dated Sep. 24, 2024; one page.
European Patent Application No. 22806563.7; Extended Search Report; dated Sep. 5, 2024; 7 pages.
Notice of Reasons for Refusal for Japanese Application No. 2023-569976, mailed Dec. 3, 2024, 6 pages.

* cited by examiner

INFORMATION PROCESSING METHOD AND APPARATUS, ELECTRONIC DEVICE, AND STORAGE MEDIUM

CROSS REFERENCE TO RELATED APPLICATIONS

The disclosure is a continuation of PCT application Ser. No. PCT/CN2022/090462, titled "INFORMATION PROCESSING METHOD AND APPARATUS, ELECTRONIC DEVICE, AND STORAGE MEDIUM", filed on Apr. 29, 2022, which claims priority to Chinese Patent Application No. 202110518504.2, field on May 12, 2021, titled "INFORMATION PROCESSING METHOD AND APPARATUS, ELECTRONIC DEVICE, AND STORAGE MEDIUM", both of which are incorporated herein by reference in their entireties.

TECHNICAL FIELD

The disclosure relates to the technical field of computers, in particular to an information processing method and apparatus, an electronic device, and a storage medium.

BACKGROUND

Instant messaging software plays an important role in daily work, and people are used to using instant messaging software to communicate about their work. However, the task creation or reminder functions provided by the traditional instant messaging software either require cumbersome input operations resulting in low task creation efficiency, or have a single function that fails to meet the user's actual work needs.

SUMMARY

This Summary section is provided to introduce concepts in a brief form, which will be described in detail below in the subsequent Detailed Description section. This Summary section is not intended to identify key features or essential features of the claimed technical solution, nor is it intended to be used to limit the scope of the claimed technical solution.

An aspect of the disclosure provides an information processing method, comprising:
 displaying a messaging interface, the messaging interface being configured to display a chat message;
 determining at least one chat message in the messaging interface; and
 generating task information based on the determined chat message in response to a task creation instruction.

Another aspect of the disclosure provides an information processing method, comprising:
 displaying a messaging interface, the messaging interface being configured to display a chat message;
 determining a chat message in the messaging interface; and
 generating task information based on the determined chat message in response to a task creation instruction, comprising: determining a value of a predetermined field of the task information based on one or more of content of the determined chat message, information of a sender of the determined chat message, and a name of a chat session associated with the determined chat message.

Yet another aspect of the disclosure provides an information processing apparatus, comprising:
 a display unit, configured to display a messaging interface, the messaging interface being configured to display a chat message;
 a determining unit, configured to determine at least one chat message in the messaging interface; and
 a generating unit, configured to generate task information based on the determined chat message in response to a task creation instruction.

Yet another aspect of the disclosure provides an electronic device, comprising:
 at least one memory and at least one processor;
 wherein the at least one memory stores instructions that upon execution by the at least one processor cause the electronic device to perform the method provided in one or more embodiments of the disclosure.

Yet another aspect of the disclosure provides a non-transitory computer storage medium, storing instructions that upon execution by a computing device, cause the computing device to perform the method provided in one or more embodiments of the disclosure.

According to the information processing method provided in one or more embodiments of the disclosure, by determining the chat messages in the messaging interface and generating the task information based on the determined chat messages, it can be facilitated for a user to create a task based on the chat messages in the messaging interface, thereby improving the efficiency of creating the task message.

BRIEF DESCRIPTION OF FIGURES

The above and other features, advantages, and aspects of embodiments of the disclosure will become more apparent by reference to the following detailed description of the embodiments when taken in conjunction with the accompanying drawings. Throughout the drawings, the same or similar reference numerals refer to the same or similar elements. It should be understood that the drawings are schematic and components and elements are not necessarily drawn to scale.

DETAILED DESCRIPTION OF THE EMBODIMENTS

The embodiments of the disclosure will be described in more detail below with reference to the accompanying drawings. Although some embodiments of the disclosure are shown in the accompanying drawings, it should be understood that the disclosure may be implemented in various forms and should not be construed as being limited to the embodiments described herein, on the contrary, these embodiments are provided for a more thorough and complete understanding of the disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" used herein and variants thereof means open-ended including, i.e., "comprising, but not limited to". The term "based on" refers to "based at least in part on". The term "one embodiment" represents "at least one embodiment"; the term "the other embodiment" represents "at least one additional embodiment"; and the term "some embodiments" represents "at least some embodiments". The term "in response to" and related terms mean that one signal or event is influenced to some extent by another signal or event, but not necessarily completely or directly. If an event (e.g., "x") occurs in response to another event (e.g., "y"), x can be directly or indirectly in response to y. For example, the occurrence of y can eventually result in the occurrence of x, but there may be other intermediate events and/or conditions. In other scenarios, y may not necessarily result in the occurrence of x, and x may occur even though y has not occurred. In addition, the term "in response to" can also mean "at least partially in response to".

The term "determining" comprises a wide variety of actions, including processing, looking up (e.g., looking up in a database, a table, or another data structure), deriving, computing, calculating, investigating, ascertaining and the like, and may include receiving, accessing (e.g., accessing data in a memory) and the like, as well as parsing, selecting, choosing, establishing and the like. Definitions of other terms will be provided in the description below.

It should be noted that the terms such as "first", "second" and the like mentioned in the disclosure are merely intended to distinguish different devices, modules, or units, rather than limiting an order of functions executed by these devices, modules or units or an interdependence among these devices, modules, or units.

It should be noted that the modifications of "a" and "multiple" mentioned in the disclosure are illustrative, but are not restrictive. It should be understood by those skilled in the art that it should be understood as "one or more" unless otherwise specified in the context.

For the purposes of the disclosure, the phrase "A and/or B" means (A), (B), or (A and B).

Names of messages or information interacted among a plurality of devices in the embodiments of the disclosure are merely for an illustrative purpose, rather than limiting the scope of these messages or information.

Figure 1:
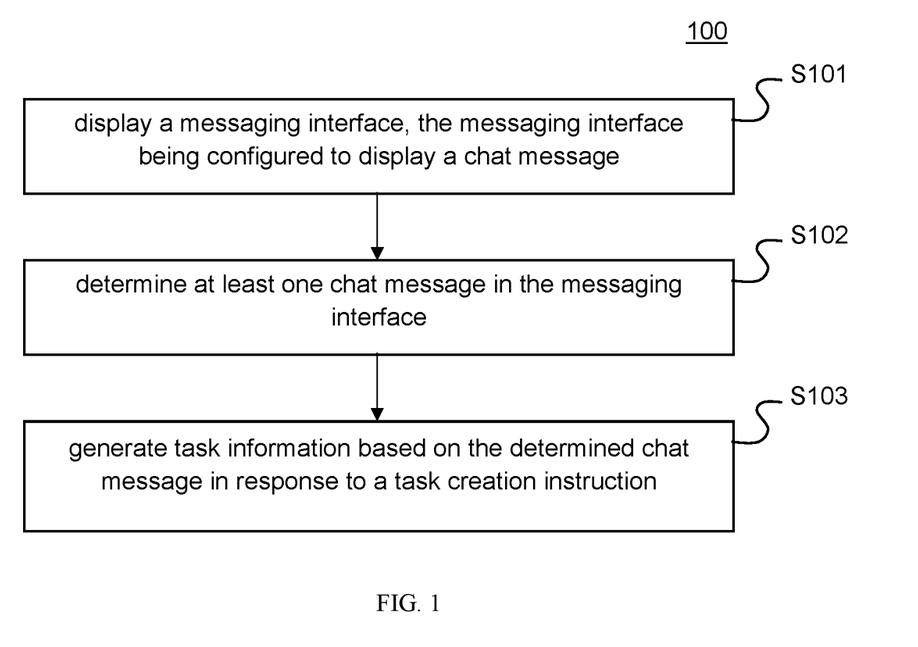
FIG. 1 is a flowchart of an information processing method provided in an embodiment of the disclosure.

FIG. 1 is a flowchart of an information processing method 100 provided in an embodiment of the disclosure. The information processing method 100 includes as follows.

At step S101, a messaging interface is displayed, the messaging interface being configured to display one or more chat messages.

In one embodiment, the messaging interface may be a messaging interface of an instant messaging client, and a user may have a session with one or more users through the instant messaging client, such as sending messages, transmitting files, and making audio or video calls, and the messaging interface may display one or more chat messages sent by one or more users, including but not limited to text messages, multimedia files such as pictures, videos and audio, documents, links, and interactive controls such as schedule cards and task cards.

At step S102, at least two chat messages in the messaging interface are determined.

In some embodiments, at least two chat messages to be processed may be determined in response to a selection operation of a user on messages displayed in the messaging interface. In one embodiment, a user may trigger a predetermined "multi-selection" control provided in the messaging interface to select a plurality of chat messages.

At step S103: task information is generated based on the at least two chat messages in response to a task creation instruction.

In some embodiments, the task creation instruction may be triggered by an operation of a user or when some predetermined condition is reached. In one embodiment, the user may trigger a predetermined control, such as a control for creating a task or a control for determining that a chat message has been selected, to create task information by an operation such as a clicking and touching the control after selecting a plurality of chat messages; or the task creation instruction is automatically triggered if the chat messages selected by the user reach a predetermined number or other conditions are met. In one embodiment, a user may select a plurality of chat messages in a messaging interface after triggering a predetermined control for creating a task, and then create task information based on the selected plurality of chat messages, such as creating task information based on the selected plurality of chat messages after clicking an "OK" button; or, the user may trigger a predetermined "multi-selection" control in the messaging interface to select a plurality of chat messages, and then trigger a predetermined control for creating a task to create task information based on the selected plurality of chat messages. In some embodiments, one or more of content information, personnel information and time information of the task information may be determined based on the input from the user.

In one embodiment, a task editing interface containing the at least two chat messages may be displayed in response to the task creation triggering operation, and the user may input relevant task information, such as task content, task deadlines and task executors in the task editing interface, and task information is generated based on the information input by the user and the at least two chat messages.

It should be noted that the generated task information may be displayed on a predetermined task display interface for displaying task information, or may also be sent as a message to the chat session currently displayed by the client or other chat sessions selected by the user, which is not limited herein.

As such, according to an information processing method provided in one or more embodiments of the disclosure, by determining the at least two chat messages in the messaging interface and generating the task information based on the determined chat messages, it can be facilitated for a user to create a task based on the chat messages in the messaging interface, thereby improving the efficiency of creating the task message.

In some embodiments, step S103 includes:

Step A1: determining a value of a predetermined field of the task information based on the at least two chat messages.

In one embodiment, the predetermined field includes, but is not limited to, a remark field of the task, a topic field of the task, a content field of the task, a personnel field of the task, a time field of the task, etc.

It should be noted that candidate words of the predetermined field may be generated based on the at least two chat messages, and a final value of the predetermined field may be determined based on the selection operation of the user on the candidate words, the input from the user, or other means, which is not limited thereto in the disclosure.

In some embodiments, step A1 includes:

Step a1: determining the value of the predetermined field based on one or more of content of the at least two chat messages, information of senders of the at least two chat messages, and a name of the chat session associated with the at least two chat messages.

In one embodiment, the sender information may be an identifier of a user sending the chat message, such as the account number, nickname, remark name and avatar of the user.

Further, in some embodiments, topic information, content information or remark information of the task information may be generated based on the content of the at least two chat messages.

Further, in some embodiments, personnel information of the task, including creators of the task, executors of the task and followers of the task, may be generated based on user information contained in the content of the at least two chat messages and/or sender information of the at least two chat messages. In one embodiment, if the conversation massage contains a predetermined field, such as "@user A", the user information in the predetermined field may be taken as the executor information of the task. The task followers may be different from the task executors, the information of which is displayed on a different area from that of the task executors, e.g., the task follower information is displayed on a first area of a task interface, and the task executors information is displayed on a second area of the task interface, so that an independent event that is different from an event performed for the task executors may be performed for the task followers, for example, a notification message is sent to the task followers, and it can be facilitated for the user to see which task followers there are.

In some embodiments, step a1 includes:

Step a11: determining at least one candidate keyword based on one or more of content of the at least two chat messages, information of senders of the at least two chat messages, and the name of the chat session associated with the at least two chat messages; and Step a12: determining a value of the predetermined field based on the selection of the user for the candidate keyword and/or the input from the user.

In one embodiment, a plurality of candidate keywords may be displayed near an input box of the predetermined fields of the task editing interface, one or more candidate keywords selected by the user may be automatically populated into the corresponding an input box, the user may edit and modify the content in the input box, and the corresponding predetermined fields is determined based on the edited and modified content.

In some embodiments, the predetermined field includes a remark field; step a1 includes determining the at least two chat messages as remark information of the task information. In the disclosure, by taking the selected chat messages as remark information in the task information, it can be convenient for the task-related personnel to understand the background and context of the task.

In some embodiments, the at least two chat messages are displayed in the predetermined area in the task information. In this embodiment, by displaying the at least two chat messages in the predetermined area, the at least two chat messages can be displayed in the task information in a relatively independent form, thereby being convenient for a user to look up.

In some embodiments, the predetermined area includes an area for remarks. In this embodiment, by displaying the selected chat messages in the remark area in the task information, it can be convenient for the task-related personnel to understand the background and context of the task. In one embodiment, the predetermined area may be presented in the form of a message block.

In some embodiments, the method 100 further includes:

Step S105: displaying a first predetermined interface in response to a triggering operation on the predetermined area in the task information, wherein the first predetermined interface is configured to display specifics of the at least two chat messages.

In one embodiment, the specifics may include the entire content of the at least two chat messages. The specifics include the entire original content of the at least two chat messages, for example, a text message which has been collapsed or abbreviated is expanded for display in the first predetermined interface, or a picture or a control is rendered in the first predetermined interface if the picture or the control is included in the at least two chat messages.

In some embodiments, a message control for displaying the at least two chat messages may be set in the display interface of the task information, and when the user triggers the message control, the first predetermined interface is displayed.

In this embodiment, on the one hand, by displaying the at least two chat messages in the predetermined area of the task information, the chat messages may be displayed in the task information in a relatively independent form; on the other hand, the user can open the first predetermined interface by triggering the predetermined area to acquire the entire content of the at least two chat messages, and it can be facilitated for the user to view all chat messages referenced by the task information, so as to learn all background information of the task information.

In some embodiments, the predetermined area displays abstract information of the at least two chat messages, and the abstract information is displayed in a predetermined style in the predetermined area. In this embodiment, by displaying the abstract information of the at least two chat messages in the predetermined area, task-related personnel can quickly know the message content.

In some embodiments, a client provided in an embodiment of the disclosure has a task display interface, wherein the task display interface is configured to display task information associated with the account on which the client logs as a task creator or executor. In this embodiment, the task information is displayed through the predetermined task display interface, and it can be facilitated for the user to manage the task information.

In some embodiments, the method 100 further includes:

Step B1: displaying the task information in the messaging interface.

In this embodiment, by posting the task information in the messaging interface where the at least two chat messages are located, it can be facilitated for the user to post the task information directly through the messaging interface.

In some embodiments, the method 100 further includes:

Step C1: displaying a chat session identifier of at least one chat session;

Step C2: determining a target chat session based on the selection of the user for the chat session identifier;

Step C3: displaying a task interface in a predetermined style in the messaging interface corresponding to the target chat session, wherein the task interface is generated based on the task information and a predetermined information structure.

In one embodiment, a predetermined chat session selection interface may be displayed after the user creates a task information, and the chat session selection interface may display one or more chat session identifiers for the user to select a target chat session to send the created task information.

In this embodiment, by displaying the task information in the messaging interface corresponding to the target chat session based on the selection of the user, and it can be facilitated for the user to send the task information to a specific user or group through the messaging interface, and a receiver can quickly acquire and look up the task information, thereby improving the task allocation efficiency.

In some embodiments, the task information displays source information of the at least two chat messages. The source information includes sender information of the messages, or information of the chat session associated with the messages, such as chat group information. In one embodiment, the content of the source information may be "chat history for user A", "chat history for user A and user B" or "group chat history" or the like.

In some embodiments, the method 100 further includes:
Step D1: determining the content of the source information based on the number of members of a chat session comprising the at least two chat messages, the content of the source information including sender information of the messages or predetermined first source information.

In one embodiment, the first source information may be predetermined characters such as "from group chat history".
Further, step D1 includes:
Step d1: determining that the content of the source information includes information of the senders if the number of members of a chat session comprising the at least two chat messages does not exceed a predetermined threshold; or,
Step d2: determining that the content of the source information includes predetermined first source information if the number of members of a chat session comprising the at least two chat messages exceeds a predetermined threshold.

In one embodiment, the predetermined threshold is 2, for example, if the at least two chat messages are both sent from the same user A, or from a chat session of user A and user B, the content of the source information may be "chat history for user A" or "chat history for user A and user B"; if the at least two chat messages are sent from more than 3 users or from a group, the source information may be "group chat history".

As such, according to the information processing method provided in one or more embodiments of the disclosure, by determining the content of the source information as the sender information of the messages or the predetermined first source information based on the number of members of a chat session comprising the at least two chat messages, the source information can be provided while other user information (e.g., message receivers' information or group names) can be prevented from being leaked.

In some embodiments, the content of the source information of the chat messages may be determined based on at least one of: the number of members of a chat session comprising the chat messages, an identifier of the sender of the chat messages, a type of the chat session associated with the chat messages, and an identifier of the chat session associated with the chat messages. The type of the chat session may include a session type involved with two people, or a group chat type involved with multiple people, and the identifier of the chat session may include a name of the chat session, such as a name of a chat group.

In some embodiments, step S103 includes:
Step E1: determining content of the at least two chat messages;

In one embodiment, if a message is of a text type, then the text contained in the message may be determined as the content of the message; if the message is of a picture type, then the image data of the picture may be determined as the content of the message.

Step E2: rendering content of the at least two chat messages in the predetermined area of the task information, wherein the content of the at least two chat messages is arranged in a predetermined style in the predetermined area.

According to the information processing method provided in one or more embodiments of the disclosure, by rendering the content of the at least two chat messages in the predetermined area so that the user can directly preview the message content of the plurality of original messages through the predetermined area without jumping to other message viewing pages, thereby improving the efficiency of the user to process information.

In some embodiments, in response to the at least two chat messages including a picture, the picture is displayed in the predetermined area; in response to the at least two chat messages including a video, a preview image for the video and/or a playing control for the video is displayed in the predetermined area; in response to the at least two chat messages including audio, audio preview data and/or an audio playing control is displayed in the predetermined area; in response to the at least two chat messages including a link, the link is displayed in the predetermined area; in response to the at least two chat messages including an interactive control, the interactive control is displayed in the predetermined area.

In one embodiment, the preview image for the video may include a screenshot of a certain frame of the video; the audio preview data may include some or all of text converted by the audio.

In this embodiment, when the message includes a non-text type message such as a picture, audio, a video, a link and an interactive control, by directly rendering the non-text type message in the predetermined area, the user can preview the content of the non-text type message directly through the predetermined area.

In some embodiments, the method 100 further includes:
Step S106: performing, in response to a triggering operation on message content displayed in the predetermined area, an original interactive function of a message corresponding to the content pointed by the triggering operation, the original interactive function comprising a function performed when the message is triggered by the triggering operation.

In some embodiments, step S106 includes:
acquiring, in response to a triggering operation on text displayed in the predetermined area, content of the text; or
displaying, in response to a triggering operation on a picture displayed in the predetermined area, the picture in an enlarged manner; or
playing, in response to a triggering operation on a multimedia file displayed in the predetermined area, the multimedia file; or downloading or opening, in response to a triggering operation on a document displayed in the predetermined area, the document; or displaying, in response to a triggering operation on a link displayed in the predetermined area, an interface corresponding to the link; or performing, in response to a triggering operation on an interactive control displayed in the predetermined area, an interactive function corresponding to the interactive control.

According to the information processing method provided in one or more embodiments of the disclosure, the message content displayed in the predetermined area inherits the original interactive functions of the chat messages, and it can be facilitated for the user to directly click on the content displayed in the message to interact with it.

In some embodiments, step S103 includes:

Step F1: generating target information based on the at least two chat messages; and Step F2: generating the task information based on the target information.

In one embodiment, the generated target information may be displayed on a task editing interface, and the user may input information such as title, content, personnel, time and the like of the task on the task editing interface, and then the task information containing the target information is generated.

In one embodiment, the target information is remark information of the task information.

In some embodiments, the method 100 further includes:

Step S104: determining a target user and authorizing the target user to have a right to view the target information.

In some embodiments, the target user includes one or more of a task creator, a task executor and a task follower of the task information.

According to one or more embodiments of the disclosure, by setting the authority for viewing the target information and authorizing it the target user, such as a task creator, a task executor and a task follower to view the target information, it can be facilitated for task-related personnel to view the target information after receiving the task information, and the target information can be prevented from being leaked to a task-unrelated person.

In one embodiment, a message container of the target information may be copied and the target user is authorized to view the message container of the target information so that the target user can view the content of the target information.

In some embodiments, the information type of the target information is a predetermined first information type. In general, the chat messages may include various types of messages such as text, pictures, videos, audio, documents and links, in this embodiment, regardless of the original types of the at least two chat messages, by generating target information of the predetermined first information type based on the at least two chat messages, the client only needs to process the rendering manner of one information type (i.e., the predetermined first information type) when generating the target information, thereby reducing the information processing burden of the client.

In some embodiments, the first information type is a combined message type that is configured to accommodate more than two chat messages.

In some embodiments, the target information is task remark information of the task information, so that the messages can be reviewed as a remark of the task by the relevant person to know the context of the task.

In some embodiments, step F1 includes:

Step f1: determining content data of the at least two chat messages;

The content data is generated based on the chat messages, which reflects substantive content of the chat messages, such as text data corresponding to a text message, and image data corresponding to a picture message.

Step f2: including the content data of the at least two chat messages in content data of the target information based on the content data of the at least two chat messages so that the target information has the content of the at least two chat messages.

In this embodiment, by rendering the target information based on the content data of the at least two chat messages, the substantive content of the at least two chat messages can be directly rendered in the target information, so that the user can directly preview the substantive content of each message through the target information in the task information.

In some embodiments, the method 100 further includes a step S107 of determining an original information type of the at least two chat messages; and step f2 further includes: generating the target information based on the content data of the at least two chat messages, the original information type and the predetermined first information type; wherein the type of the target information is the first information type. The original information type is an information type of the chat message, for example, an information type of a text message is a text information type, an information type of a picture message is a picture information type, and an information type of an audio message is an audio information type.

In some embodiments, a message list corresponding to the first information type may be obtained, and includes the at least two chat messages, and the content of the target information is generated based on content data and original information type of each chat message in the message list. In one embodiment, a message list corresponding to the first information type may be predetermined.

In some embodiments, information type registration may be performed based on the original information types of the corresponding chat messages, a message data model is determined based on the first information type, and content data of the chat messages is injected into the message data model, so that target information can be directly previewed with small changes to the server and without other software development kits (SDK) are not needed, and the target information inherits interactive functions of the chat messages, and a user can click on the content displayed by the target information to perform corresponding interactive functions, such as clicking on a picture to view a larger version, clicking on a video to play the video, clicking on a document to download or open the document and performing corresponding functions of interactive controls, etc.

As such, according to the information processing method provided in one or more embodiments of the disclosure, by predetermining a specific information type (i.e., the predetermined first information type) for the target information, and generating the target information based on content data of the at least two chat messages, the original information type and the predetermined first information type, the content of the at least two chat messages can be rendered directly in the target information within the task information with small changes to the server, and the target information can inherit the interactive capabilities of the chat messages.

In some embodiments, the information of the predetermined first information type is organized to accommodate one or more information and can be included within the information of the same type. Thus, the information of the predetermined first information type can simultaneously accommodate a plurality of sub-information, and it can also be included as sub-information in other information (e.g., task information), thereby realizing a multi-level information nesting structure.

Figure 2:
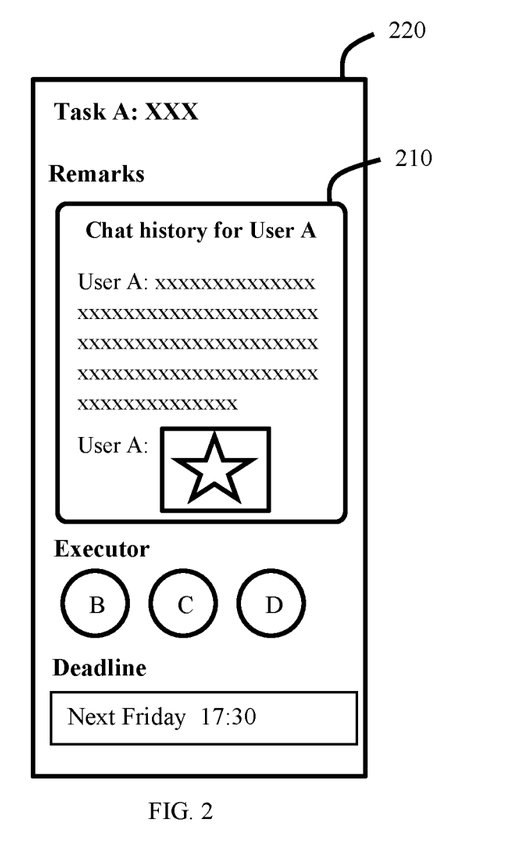
FIG. 2 is a schematic diagram of task information provided in an embodiment of the disclosure.

FIG. 2 is a schematic diagram of task information provided in one embodiment of the disclosure. The task information 220 displays a task title "Task A: XXX", a predetermined area 210, executor "B, C, D" of the task, and deadline "Next Friday 17:30". The predetermined area 210 displays two chat messages determined according to one or more embodiments of the disclosure, both of which are sent from "User A", wherein one chat message is a text message and the other chat message is a picture with a star pattern. The predetermined area 210 also displays source information "Chat history for User A".

Figure 3:
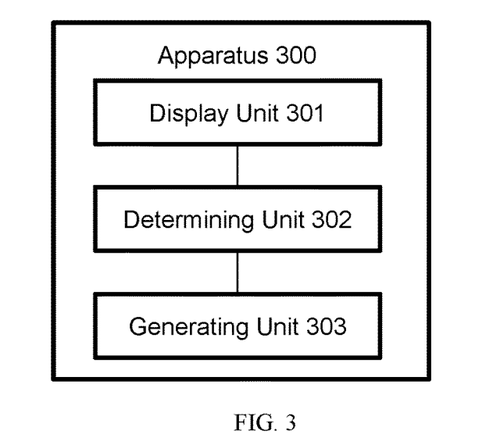
FIG. 3 is a structural schematic diagram of an information processing apparatus provided in an embodiment of the disclosure.

Correspondingly, as shown in FIG. 3, according to another embodiment of the disclosure, there is provided an information processing apparatus 300, including:

a display unit 301, configured to display a messaging interface, the messaging interface being configured to display a chat message;

a determining unit 302, configured to determine at least two chat messages in the messaging interface; and a generating unit 303, configured to generate task information based on the at least two chat messages in response to a task creation instruction.

As such, according to the information processing apparatus provided in one or more embodiments of the disclosure, by determining the at least two chat messages in the messaging interface and generating the task information based on the determined chat messages, it can be facilitated for a user to create a task based on a plurality of chat messages in the messaging interface, thereby improving the creation efficiency of the task information.

In some embodiments, the generating unit 303 includes:

a field determining subunit, configured to determine a value of a predetermined field of the task information based on the at least two chat messages.

In one embodiment, the predetermined field includes, but is not limited to, a remark field of the task, a topic field of the task, a content field of the task, a personnel field of the task, a time field of the task, etc.

In some embodiments, the field determining subunit is configured to determine the value of the predetermined field based on one or more of content of the at least two chat messages, information of senders of the at least two chat messages, and information of name of a chat session associated with the at least two chat messages.

Further, in some embodiments, the field determining subunit is configured to generate topic information, content information or remark information of the task information based on the content of the at least two chat messages.

Further, in some embodiments, the field determining subunit is configured to generate personnel information of the task, including creators of the task, executors of the task, followers of the task, and the like, based on user information contained in the content of the at least two chat messages and/or sender information of the at least two chat messages. In one embodiment, when the chat session information contains a predetermined field, e.g., "@user A", the user information in the predetermined field may be taken as the executor information of the task.

In some embodiments, the field determining subunit is configured to determine at least one candidate keyword based on one or more of content of the at least two chat messages, information of senders of the at least two chat messages, and information of name of a chat session associated with the at least two chat messages, and determine a value of the predetermined field based on the selection of the user for the candidate keyword and/or the input by the user.

In one embodiment, a plurality of candidate keywords may be displayed near an input box of the predetermined fields of the task editing interface, one or more candidate keywords selected by the user may be automatically populated into the corresponding an input box, the user may edit and modify the content in the input box, and the corresponding predetermined fields is determined based on the edited and modified content.

In some embodiments, the predetermined field includes a remark field; the field determining subunit is configured to determine the at least two chat messages as remark information of the task information. In the disclosure, by taking the selected chat messages as remark information in the task information, it can be facilitated for task-related personnel to know the background information and context of the task.

In some embodiments, the at least two chat messages are displayed in the predetermined area in the task information. In this embodiment, by displaying the at least two chat messages in the predetermined area, the at least two chat messages can be displayed in the task information in a relatively independent form, thereby being convenient for a user to look up.

In some embodiments, the predetermined area includes an area for remarks. In this embodiment, by displaying the selected chat messages in the remark area in the task information, it can be facilitated for the task-related personnel to understand the background and context of the task. In one embodiment, the predetermined area may be presented in the form of a message block.

In some embodiments, the apparatus 300 further includes:

a specifics displaying unit, configured to display a first predetermined interface in response to a triggering operation on the predetermined area in the task information, wherein the first predetermined interface is configured to display specifics of the at least two chat messages.

In one embodiment, the specifics may display the entire content of the at least two chat messages. The specifics include the entire original content of the at least two chat messages, for example, a text message which has been collapsed or abbreviated is expanded for display in the first predetermined interface, or a picture or a control is rendered in the first predetermined interface if the picture or the control is included in the at least two chat messages.

In some embodiments, a message control for displaying the at least two chat messages may be set in the display interface of the task information, and when the user triggers the message control, the first predetermined interface is displayed.

In some embodiments, the predetermined area displays abstract information of the at least two chat messages, and the abstract information is displayed in a predetermined style in the predetermined area. In this embodiment, by displaying the abstract information of the at least two chat messages in the predetermined area, it can be facilitated for task-related personnel to know the content of the messages.

In some embodiments, a client provided in an embodiment of the disclosure has a task display interface, wherein the task display interface is configured to display task information associated with the account on which the client logs as a task creator or executor. In this embodiment, the task information is displayed through the predetermined task display interface, and it can be facilitated for the user to manage the task information.

In some embodiments, the apparatus 300 further includes:
a task displaying unit, configured to display the task information in the messaging interface.

In this embodiment, by posting the task information in the messaging interface where the at least two chat messages are located, it can be facilitated for the user to post the task information directly through the messaging interface.

In some embodiments, the apparatus 300 further includes:
a chat session identifier displaying unit, configured to display a chat session identifier of at least one chat session;
a target chat session determining unit, configured to determine a target chat session based on the selection of a user for the chat session identifier; and
a task interface displaying unit, configured to display a task interface in a predetermined style in the messaging interface corresponding to the target chat session, wherein the task interface is obtained based on the task information and a predetermined information structure.

In some embodiments, the task information displays source information of the at least two chat messages. The source information includes sender information of the messages, or information of a chat session associated with the messages, such as chat group information. In one embodiment, the content of the source information may be "chat history for user A", "chat history for user A and user B" or "group chat history" or the like.

In some embodiments, the apparatus 300 further includes:
a source information determining unit, configured to determine the content of the source information based on the number of members of a chat session comprising the at least two chat messages, wherein the content of the source information includes sender information of the messages or predetermined first source information.

In one embodiment, the first source information may be predetermined characters such as "from group chat history".

Further, the source information determining unit is configured to determine that the content of the source information includes information of the senders if the number of members of a chat session comprising the at least two chat messages does not exceed a predetermined threshold, or, determine that the content of the source information includes predetermined first source information if the number of members of a chat session comprising the at least two chat messages exceeds a predetermined threshold.

In some embodiments, the generating unit 303 is configured to determine the message content of the at least two chat messages, and render content of the at least two chat messages in the predetermined area of the task information, wherein the content of the at least two chat messages is arranged in a predetermined style in the predetermined area.

In some embodiments, if the at least two chat messages include a picture, the picture is displayed in the predetermined area; if the at least two chat messages include a video, a preview image for the video and/or a playing control for the video is displayed in the predetermined area; if the at least two chat messages include audio, audio preview data and/or an audio playing control is displayed in the predetermined area; if the at least two chat messages include a link, the link is displayed in the predetermined area; if the at least two chat messages include an interactive control, the interactive control is displayed in the predetermined area.

In one embodiment, the preview image for the video may include a screenshot of a certain frame of the video; the audio preview data may include some or all of text converted by the audio.

In this embodiment, when the message includes a non-text type message such as a picture, audio, a video, a link and an interactive control, by directly rendering the non-text type message in the predetermined area, the user can preview the content of the non-text type message directly through the predetermined area.

In some embodiments, the apparatus 300 further includes:
an interaction unit, configured to perform, in response to a triggering operation on the message content displayed in the predetermined area, an original interactive function of a message corresponding to the content pointed by the triggering operation; wherein the original interactive function includes a function performed when the message is triggered by the triggering operation.

In some embodiments, the interaction unit is configured to acquire, in response to a triggering operation on text displayed in the predetermined area, the content of the text; or, display, in response to a triggering operation on a picture displayed in the predetermined area, the picture in an enlarged manner; or, play, in response to a triggering operation on a multimedia file displayed in the predetermined area, the multimedia file; or, download or open, in response to a triggering operation on a document displayed in the predetermined area, the document; or, display, in response to a triggering operation on a link displayed in the predetermined area, an interface corresponding to the link; or, perform, in response to a triggering operation on an interactive control displayed in the predetermined area, an interactive function corresponding to the interactive control.

In some embodiments, the generating unit 303 includes:
a target information generating subunit, configured to generate target information based on the at least two chat messages; and
a task information generating subunit, configured to generate the task information based on the target information.

In one embodiment, the generated target information may be displayed on a task editing interface, and the user may input information such as title, content, person, time and the like of the task on the task editing interface, and then the task information containing the target information is generated.

In one embodiment, the target information is remarks information of the task information.

In some embodiments, the apparatus 300 further includes:
an authority determining unit, configured to determine a target user and authorize the target user to have a right to view the target information.

In some embodiments, the target information generating subunit is configured to determine content data of the at least two chat messages, and include the content data of the at least two chat messages in content data of the target information based on the content data of the at least two chat messages so that the target information has the message content of the at least two chat messages.

In some embodiments, the apparatus 300 further includes:
an original information determining unit, configured to determine an original information type of the at least two chat messages; the target information generating subunit is further configured to generate the target information based on the content data of the at least two chat messages, the original information type and a predetermined first information type; wherein the type of the target information is the first information type. The original information type is an information type of the chat message, for example, an information type of a text message is a text information type, an information type of a picture message is a picture information type, and an information type of an audio message is an audio information type.

In some embodiments, a message list corresponding to the first information type may be obtained, and includes the at least two chat messages, and the content of the target information is generated based on content data and original information type of each chat message in the message list. In one embodiment, a message list corresponding to the first information type may be predetermined.

In some embodiments, information type registration may be performed based on the original information types of the corresponding chat messages, a message data model is determined based on the first information type, and content data of the chat messages is injected into the message data model, so that target information can be directly previewed with small changes to the server and without other software development kits (SDK) are not needed, and the target information inherits interactive functions of the chat messages, and a user can click on the content displayed by the target information to perform corresponding interactive functions, such as clicking on a picture to view a larger version, clicking on a video to play the video, clicking on a document to download or open the document and performing corresponding functions of interactive controls, etc.

For the embodiments of the apparatus, which substantially correspond to the method embodiments, reference is made to the partial description of the method embodiments. The apparatus embodiments described above are merely schematic, wherein modules described as separate modules may or may not be separate. Some or all of the modules may be selected according to actual needs to achieve the objective of the embodiment. A person having ordinary skill in the art can understand and implement without inventive step.

Correspondingly, according to one or more embodiments of the disclosure, an electronic device is provided, including:
at least one memory and at least one processor,
wherein the at least one memory stores instructions that upon execution by the at least one processor cause the electronic device to perform the information processing method provided in one or more embodiments of the disclosure.

Correspondingly, according to one or more embodiments of the disclosure, a non-transitory computer storage medium is provided, storing instructions that upon execution by a computing device, cause the computing device to perform the information processing method provided in one or more embodiments of the disclosure.

Figure 4:
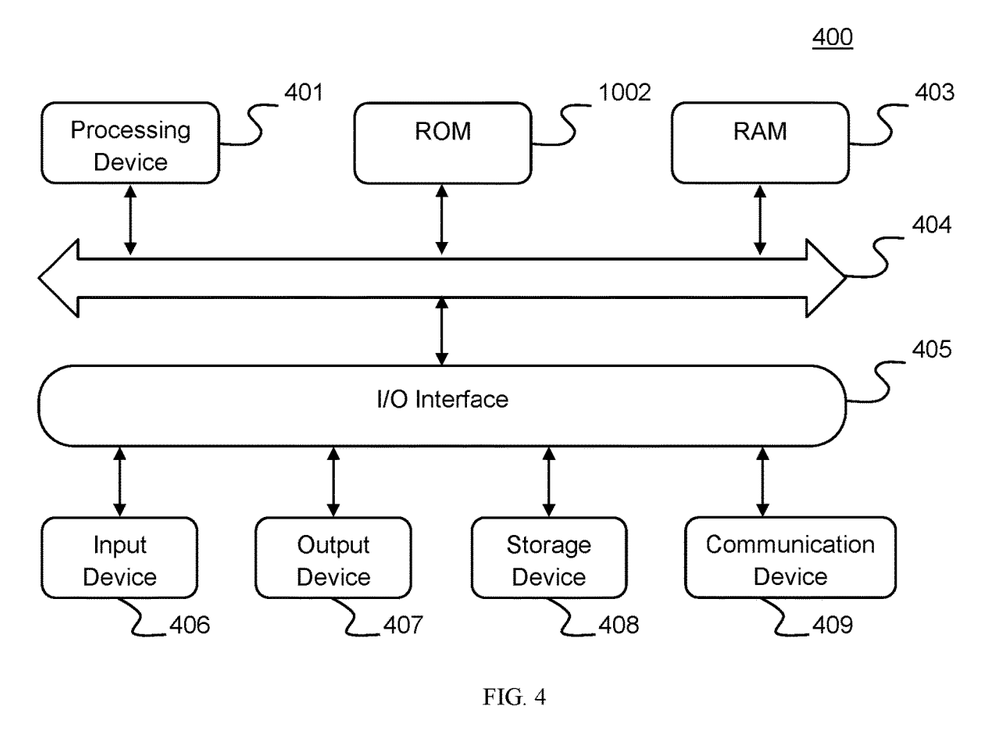
FIG. 4 is a structural schematic diagram of an electronic device for implementing an embodiment of the disclosure.

Referring now to FIG. 4, a structural schematic diagram of electronic device 400 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 4 is only an example, and should not bring any restrictions on the functions and application scope of the embodiments of the present disclosure.

As shown in FIG. 4, the electronic device 400 can comprise a processing device (e.g., central processing unit, graphics processor, etc.) 401, which can perform various appropriate actions and processing according to a program stored in a read-only memory (ROM) 402 or a program loaded into a random access memory (RAM) 403 from a storage device 408. In the RAM 403, various programs and data required for the operation of the electronic device 400 are also stored. The processing device 401, the ROM 402, and the RAM 403 are connected through a bus 404. An Input/Output (I/O) interface 405 is also connected to the bus 404.

Generally, the following devices can be connected to the I/O interface 405: an input device 406 such as a touch screen, a touch pad, a keyboard, a mouse, a camera, a microphone, an accelerometer, and a gyroscope; an output device 407 such as a liquid crystal display (LCD), a speaker and a vibrator; a storage device 408 such as a magnetic tape and a hard disk; and a communication device 409. The communication device 409 can allow the electronic device 400 to perform wireless or wired communication with other equipment to exchange data. Although FIG. 4 shows the electronic device 400 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 409, or installed from the storage device 408, or installed from the ROM 402. When the computer program is executed by the processing device 401, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (Hypertext Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the electronic device, and can also exist alone without being assembled into the electronic device.

The computer-readable medium stores instructions that upon execution by the at least one processor cause the electronic device to: display a messaging interface, the messaging interface being configured to display a chat message; determine at least one chat message in the messaging interface; and generate task information based on the determined chat message in response to a task creation instruction.

Computer program codes for performing the operations of the disclosure can be written in one or more programming languages or a combination thereof, including object-oriented programming languages such as JAVA®, SMALLTALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the display unit can also be described as "a unit for displaying a messaging interface".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides an information processing method, comprising: displaying a messaging interface, the messaging interface being configured to display a chat message; determining at least one chat message in the messaging interface; and generating task information based on the determined chat message in response to a task creation instruction.

In some embodiments, the generating task information based on the determined chat message comprises: generating task information based on input from a user and the determined chat message.

In some embodiments, the generating task information based on the determined chat message comprises: determining a value of a predetermined field of the task information based on the determined chat message.

In some embodiments, the generating task information based on the determined chat message comprises: determining a value of the predetermined field based on one or more of content of the determined chat message, information of a sender of the determined chat message, and the name of the chat session associated with the determined chat messages; wherein the predetermined field comprises one or more of a remark field of a task, a topic field of the task, a content field of the task, a personnel field of the task and a time field of the task.

In some embodiments, the predetermined field comprises a remark field, and wherein the determining a value of a predetermined field of the task information based on the determined chat message comprises: determining the determined chat message as remark information of the task information.

In some embodiments, the determined chat message is displayed in a predetermined area in the task information.

In some embodiments, the method provided further comprises: displaying a first predetermined interface in response to a triggering operation on the predetermined area in the task information, the first predetermined interface being configured to display specifics of the determined chat message.

In some embodiments, the predetermined area comprises an area for remarks.

In some embodiments, abstract information of the determined chat message is displayed in a predetermined style in the predetermined area.

In some embodiments, the generating the task information based on input from a user and the determined chat message comprises: determining one or more of content information, personnel information and time information of the task information based on the input from the user.

In some embodiments, the determining a value of a predetermined field of the task information based on the determined chat message comprises: determining at least one candidate keyword based on one or more of content of the determined chat message, information of a sender of the determined chat message, and a name of the chat session associated with the determined chat message; and determining a value of the predetermined field based on the selection of the user for the candidate keyword and/or input from the user.

In some embodiments, the task information displays source information of the determined chat message, and wherein the method further comprises: determining content of the source information based on the number of members of a chat session comprising the determined chat messages, wherein the content of the source information comprises sender information of the message or predetermined first source information.

In some embodiments, the determining content of the source information based on the number of members of a chat session comprising the determined chat message comprises: determining that the content of the source information comprises information of the senders if the number of members of a chat session comprising the determined chat message does not exceed a predetermined threshold; determining that the content of the source information comprises the predetermined first source information if the number of members of a chat session comprising the determined chat message exceeds a predetermined threshold.

In some embodiments, the chat message comprises at least one of a text, a multimedia file, a document, a link and an interactive control.

In some embodiments, if the determined chat message comprises a picture, the picture is displayed in the predetermined area; if the determined chat message comprises a video, a preview image for the video and/or a playing control for the video is displayed in the predetermined area; if the determined chat message comprises audio, audio preview data and/or an audio play control is displayed in the predetermined area; if the determined chat message comprises a link, the link is displayed in the predetermined area; if the determined chat message comprises an interactive control, the interactive control is displayed in the predetermined area.

In some embodiments, the method provided further comprises: performing, in response to a triggering operation on message content displayed in the predetermined area, an original interactive function of a message corresponding to the message content pointed by the triggering operation, the original interactive function comprising a function performed when the message is triggered by the triggering operation.

In some embodiments, the performing, in response to a triggering operation on message content displayed in the predetermined area, an original interactive function of a message corresponding to the message content pointed by the triggering operation comprises: acquiring, in response to a triggering operation on text displayed in the predetermined area, content of the text; or displaying, in response to a triggering operation on a picture displayed in the predetermined area, the picture in an enlarged manner; or playing, in response to a triggering operation on a multimedia file displayed in the predetermined area, the multimedia file; or downloading or opening, in response to a triggering operation on a document displayed in the predetermined area, the document; or displaying, in response to a triggering operation on a link displayed in the predetermined area, an interface corresponding to the link; or performing, in response to a triggering operation on an interactive control displayed in the predetermined area, an interactive function corresponding to the interactive control.

In some embodiments, the generating task information based on the determined chat message comprises: generating target information based on the determined chat message; and generating the task information based on the target information.

In some embodiments, the method provided further comprises: determining a target user and authorizing the target user to have a right to view the target information.

In some embodiments, the target user comprises one or more of a task creator, a task executor and a task follower of the task information.

In some embodiments, an information type of the target information is a predetermined first information type.

In some embodiments, the first information type is a combined message type, and the combined message type is configured to accommodate more than two chat messages.

In some embodiments, the generating target information of the task information based on the determined chat message comprises: determining content data of the determined chat message; and including the content data of the determined chat message in content data of the target information based on the content data of the determined chat message so that the target information has content of the determined chat message.

In some embodiments, the method provided further comprises: determining an original information type of the determined chat message; and wherein the including the content data of the determined chat message in content data of the target information based on the content data of the determined chat message comprises: generating the target information based on the content data of the determined chat message, the original information type and a predetermined first information type, a type of the target information being the first information type.

In some embodiments, the generating the target information based on the content data of the determined chat message, the original information type and a predetermined first information type comprises: acquiring a message list corresponding to the first information type, the message list comprising the determined chat message; and generating message content of the target information based on content data and original information type of the chat message in the message list.

In some embodiments, the determining at least one chat message in the messaging interface comprises: determining at least two chat messages in the messaging interface.

In some embodiments, the disclosure provides an information processing method, comprising: displaying a messaging interface, the messaging interface being configured to display a chat message; determining a chat message in the messaging interface; and generating task information based on the determined chat message in response to a task creation instruction, comprising: determining a value of a predetermined field of the task information based on one or more of content of the determined chat message, information of a sender of the determined chat message, and a name of the chat session associated with the determined chat message.

In some embodiments, the disclosure provides an information processing apparatus, comprising: a display unit, configured to display a messaging interface, the messaging interface being configured to display a chat message; a determining unit, configured to determine at least one chat message in the messaging interface; and a generating unit, configured to generate task information based on the determined chat message in response to a task creation instruction.

In some embodiments, the disclosure provides an electronic device, comprising: at least one memory and at least one processor, wherein the at least one memory stores instructions that upon execution by the at least one processor cause the electronic device to perform the method provided in one or more embodiments of the disclosure.

In some embodiments, the disclosure a non-transitory computer storage medium, storing instructions that upon execution by a computing device, cause the computing device to perform the method provided in one or more embodiments of the disclosure.

Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An information processing method, comprising:
    displaying a messaging interface, the messaging interface being configured to display chat messages;
    determining at least two chat messages in the messaging interface;
    creating task information based on the determined at least two chat messages in response to a task creation instruction of creating a task;
    sending the created task information as a message to the messaging interface where the at least two chat messages are located;
    displaying a chat session selection interface in response to determining that the task information is created, wherein the chat session selection interface is configured to display one or more identifiers of one or more chat sessions;
    determining a target chat session based on a selection performed on the chat session selection interface;
    displaying a task interface in a predetermined style in a target messaging interface corresponding to the target chat session to which the task information is sent, wherein the task interface is generated based on the created task; and
    displaying the at least two chat messages in a predetermined area associated with the task interface, wherein the predetermined area is configured to enable a user to view original content of the at least two chat messages.

2. The information processing method according to claim 1, wherein the creating task information based on the determined at least two chat messages comprises at least one of:
    generating the task information based on input from a user and the determined at least two chat messages;
    determining a value of a predetermined field of the task information based on the determined chat message.

3. The information processing method according to claim 2, wherein the creating task information based on the determined at least two chat messages comprises:
    determining a value of the predetermined field based on at least one of: content of the at least two determined chat messages, information of a sender of the at least two determined chat messages, and a name of a chat session associated with the at least two determined chat messages; wherein the predetermined field comprises at least one of: a remark field of a task, a topic field of the task, a content field of the task, a personnel field of the task and a time field of the task.

4. The information processing method according to claim 2, wherein the predetermined field comprises a remark field, and
    wherein the determining a value of a predetermined field of the task information based on the at least two determined chat messages comprises: determining the determined chat message as remark information of the task information.

5. The information processing method according to claim 1, wherein the determined at least two chat messages is displayed in a predetermined area in a task information interface.

6. The information processing method according to claim 5, wherein at least one of the following is comprised:
    the predetermined area comprises an area for remarks;
    abstract information of the determined at least two chat messages is displayed in a predetermined style in the predetermined area;
    displaying a first interface in response to a triggering operation on the predetermined area, the first interface being configured to display specifics of the determined at least two chat messages.

7. The information processing method according to claim 2, wherein the creating the task information based on input from a user and the at least two determined chat messages comprises:

determining at least one of the following based on the input from a user: content information, personnel information, and time information of the task information.

8. The information processing method according to claim 3, wherein the determining a value of a predetermined field of the task information based on the determined at least two chat messages comprises:
determining at least one candidate keyword based on at least one of: content of the determined at least two chat messages, information of a sender of the determined at least two chat messages, and a name of a chat session associated with the determined at least two chat messages; and
determining a value of the predetermined field based on at least one of: the selection of the user for the candidate keyword, input from the user.

9. The information processing method according to claim 1, wherein the task information displays source information of the determined at least two chat messages, and
the method further comprises at least one of:
determining content of the source information based on at least one of: the number of members of a chat session comprising the determined at least two chat messages, an identifier of the sender, a type of the chat session and a chat session identifier;
the content of the source information comprises at least one of: sender information of the at least two messages, predetermined first source information.

10. The information processing method according to claim 9, wherein the determining content of the source information based on the number of members of a chat session comprises:
determining that the content of the source information comprises information of the senders if the number of members of the chat session does not exceed a predetermined threshold;
determining that the content of the source information comprises the predetermined first source information if the number of members of the chat session exceeds a predetermined threshold.

11. The information processing method according to claim 1, wherein the chat message comprises at least one of: a text, a multimedia file, a document, a link and an interactive control.

12. The information processing method according to claim 5, wherein at least one of the following is comprised:
in response to the determined at least two chat messages comprising a picture, the picture is displayed in the predetermined area;
in response to the determined at least two chat messages comprising a video, at least one of the following is displayed in the predetermined area: a preview information for the video, a playing control for the video;
in response to the determined at least two chat messages comprising audio, at least one of audio preview data and an audio play control is displayed in the predetermined area;
in response to the determined at least two chat messages comprising a link, the link is displayed in the predetermined area;
in response to the determined at least two chat messages comprising an interactive control, the interactive control is displayed in the predetermined area.

13. The information processing method according to claim 5, further comprising:
performing, in response to a triggering operation on message content displayed in the predetermined area, an original interactive function of a message corresponding to the message content, the original interactive function comprising a function performed when the message is triggered.

14. The information processing method according to claim 13, wherein the performing, in response to a triggering operation on message content displayed in the predetermined area, an original interactive function of a message corresponding to the message content comprises at least one of the following:
acquiring, in response to a triggering operation on text displayed in the predetermined area, content of the text;
displaying, in response to a triggering operation on a picture displayed in the predetermined area, the picture in an enlarged manner;
playing, in response to a triggering operation on a multimedia file displayed in the predetermined area, the multimedia file;
downloading or opening, in response to a triggering operation on a document displayed in the predetermined area, the document;
displaying, in response to a triggering operation on a link displayed in the predetermined area, an interface corresponding to the link;
performing, in response to a triggering operation on an interactive control displayed in the predetermined area, an interactive function corresponding to the interactive control.

15. The information processing method according to claim 1, wherein the creating task information based on the determined at least two chat messages comprises:
generating target information based on the determined at least two chat messages; and
generating the task information based on the target information.

16. The information processing method according to claim 15, wherein at least one of the following is comprised:
an information type of the target information is a predetermined first information type; or determining a target user and authorizing the target user to have a right to view the target information; or
wherein the generating target information of the task information based on the determined at least two chat messages comprises: determining content data of the determined at least two chat messages; and based on the content data of the determined at least two chat messages, including the content data of the determined at least two chat messages within content data of the target information so that the target information has content of the determined at least two chat messages.

17. The information processing method according to claim 16, wherein the target user comprises at least one of: a task creator, a task executor and a task follower of the task information.

18. The information processing method according to claim 16, wherein the first information type is a combined message type, and the combined message type is configured to accommodate two or more chat messages.

19. The information processing method according to claim 16, further comprising:
determining an original information type of the determined at least two chat messages;
and wherein the including the content data of the determined at least two chat messages within content data of the target information comprises: generating the target information based on at least one of: the content data of the determined at least two chat messages, the original information type, a predetermined first information type, wherein a type of the target information is the first information type.

20. The information processing method according to claim 19, wherein the generating the target information comprises:
acquiring a message list corresponding to the first information type, the message list comprising the determined at least two chat messages; and
generating message content of the target information based on content data and original information type of the chat message in the message list.

21. An information processing method, comprising:
displaying a messaging interface, the messaging interface being configured to display chat messages;
determining at least two chat messages in the messaging interface;
creating task information based on the determined at least two chat messages in response to a task creation instruction of creating a task, wherein the creating task information further comprises determining a value of a predetermined field of the task information based on at least one of content of the determined at least two chat messages, information of at least one sender of the determined at least two chat messages, or a name of at least one chat session associated with the determined at least two chat messages;
sending the created task information as a message to the messaging interface where the at least two chat messages are located;
displaying a chat session selection interface in response to determining that the task information is created, wherein the chat session selection interface is configured to display one or more identifiers of one or more chat sessions;
determining a target chat session based on a selection performed on the chat session selection interface;
displaying a task interface in a predetermined style in a target messaging interface corresponding to the target chat session to which the task information is sent, wherein the task interface is generated based on the created task; and
displaying the at least two chat messages in a predetermined area associated with the task interface, wherein the predetermined area is configured to enable a user to view original content of the at least two chat messages.

22. An information processing apparatus, comprising:
at least one processor; and
at least one memory communicatively coupled to the at least one processor and storing instructions that upon execution by the at least one processor cause the apparatus to:
display a messaging interface, the messaging interface being configured to display chat messages;
determine at least two chat messages in the messaging interface;
create task information based on the determined at least two chat messages in response to a task creation instruction of creating a task;

send the created task information as a message to the messaging interface where the at least two chat messages are located;
display a chat session selection interface in response to determining that the task information is created, wherein the chat session selection interface is configured to display one or more identifiers of one or more chat sessions;
determine a target chat session based on a selection performed on the chat session selection interface;
display a task interface in a predetermined style in a target messaging interface corresponding to the target chat session to which the task information is sent, wherein the task interface is generated based on the created task; and
display the at least two chat messages in a predetermined area associated with the task interface, wherein the predetermined area is configured to enable a user to view original content of the at least two chat messages.

23. An electronic device, comprising:
at least one memory and at least one processor,
wherein the at least one memory stores instructions that upon execution by the at least one processor cause the electronic device to perform operations comprising:
displaying a messaging interface, the messaging interface being configured to display chat messages;
determining at least two chat messages in the messaging interface;
creating task information based on the determined at least two chat messages in response to a task creation instruction of creating a task, wherein the creating task information further comprises determining a value of a predetermined field of the task information based on at least one of content of the determined at least two chat messages, information of at least one sender of the determined at least two chat messages, or a name of at least one chat session associated with the determined at least two chat messages;
sending the created task information as a message to the messaging interface where the at least two chat messages are located;
displaying a chat session selection interface in response to determining that the task information is created, wherein the chat session selection interface is configured to display one or more identifiers of one or more chat sessions;
determining a target chat session based on a selection performed on the chat session selection interface;
displaying a task interface in a predetermined style in a target messaging interface corresponding to the target chat session to which the task information is sent, wherein the task interface is generated based on the created task; and
displaying the at least two chat messages in a predetermined area associated with the task interface, wherein the predetermined area is configured to enable a user to view original content of the at least two chat messages.

* * * * *